US007548794B2

(12) United States Patent
Vandergriff et al.

(10) Patent No.: US 7,548,794 B2
(45) Date of Patent: Jun. 16, 2009

(54) VIRTUAL SIZING SYSTEM AND METHOD

(75) Inventors: Chris Vandergriff, Reynoldsburg, OH (US); Jeannmarie Peifer, Yellow Springs, OH (US)

(73) Assignee: G & K Services, Inc., Minnetonka, MN (US)

( * ) Notice: Subject to any disclaimer, the term of this patent is extended or adjusted under 35 U.S.C. 154(b) by 0 days.

(21) Appl. No.: 11/659,056

(22) PCT Filed: Sep. 1, 2006

(86) PCT No.: PCT/US2006/034261

§ 371 (c)(1),
(2), (4) Date: Jan. 31, 2007

(87) PCT Pub. No.: WO2007/028038

PCT Pub. Date: Mar. 8, 2007

(65) Prior Publication Data

US 2008/0255920 A1    Oct. 16, 2008

Related U.S. Application Data

(60) Provisional application No. 60/713,938, filed on Sep. 1, 2005, provisional application No. 60/763,153, filed on Jan. 27, 2006.

(51) Int. Cl.
G06F 19/00 (2006.01)
(52) U.S. Cl. ........................................ 700/132; 705/26
(58) Field of Classification Search ................. 700/130, 700/131, 132; 705/26, 27
See application file for complete search history.

(56) References Cited

U.S. PATENT DOCUMENTS

| 4,586,150 | A |   | 4/1986  | Budziak et al. |
| 4,598,376 | A |   | 7/1986  | Burton et al. |
| 4,916,634 | A |   | 4/1990  | Collins et al. |
| 5,163,007 | A | * | 11/1992 | Slilaty ........................ 700/132 |
| 5,680,528 | A |   | 10/1997 | Korszun |
| 5,930,769 | A | * | 7/1999  | Rose ........................... 705/26 |
| 5,956,525 | A | * | 9/1999  | Minsky ........................ 396/3 |

(Continued)

FOREIGN PATENT DOCUMENTS

JP    57-161602    10/1982

OTHER PUBLICATIONS

International Search Report (2 pgs.).

*Primary Examiner*—Gary L. Welch
*Assistant Examiner*—Nathan E Durham
(74) *Attorney, Agent, or Firm*—Brooks, Cameron & Huebsch, PLLC

(57) ABSTRACT

Systems and methods for selecting, ordering, or furnishing apparel for individual members of a group such that the group members dressed to project a commonly-governed image. One or more image criteria are established that associate a set of apparel specifications with corresponding body properties according to the commonly-governed image to be maintained for the group. Virtual sizing sessions are conducted with participating members of the group via an interactive virtual sizing application interfaced with a computer network. User-specific information from a set of users (e.g., group members) is automatically gathered over the computer network, and a set of virtual sizing results is generated by at least processing user-specific information gathered from the set of users. The processing is based on the image criteria.

55 Claims, 9 Drawing Sheets

U.S. PATENT DOCUMENTS

| | | | |
|---|---|---|---|
| 6,353,770 B1 * | 3/2002 | Ramsey et al. | 700/131 |
| 6,546,309 B1 | 4/2003 | Gazzuolo | |
| 6,564,118 B1 * | 5/2003 | Swab | 700/131 |
| 6,661,433 B1 | 12/2003 | Lee | |
| 6,665,577 B2 | 12/2003 | Onyshkevych et al. | |
| 6,711,455 B1 | 3/2004 | Holloway et al. | |
| 6,903,756 B1 | 6/2005 | Giannini | |
| 6,907,310 B2 | 6/2005 | Gardner et al. | |
| 6,968,075 B1 | 11/2005 | Chang | |
| 7,020,538 B2 * | 3/2006 | Luhnow | 700/132 |
| 7,079,134 B2 * | 7/2006 | Kung et al. | 345/420 |
| 7,194,327 B2 | 3/2007 | Lam | |
| 7,194,428 B2 | 3/2007 | Wan et al. | |
| 7,242,999 B2 | 7/2007 | Wang | |
| 2001/0026272 A1 * | 10/2001 | Feld et al. | 345/419 |
| 2002/0004763 A1 | 1/2002 | Lam | |
| 2002/0103566 A1 * | 8/2002 | Gadson | 700/132 |
| 2002/0188372 A1 * | 12/2002 | Lane et al. | 700/130 |
| 2003/0011590 A1 * | 1/2003 | Kung et al. | 345/419 |
| 2003/0016844 A1 | 1/2003 | Numaoka | |
| 2003/0171839 A1 | 9/2003 | McCormick | |
| 2004/0078285 A1 * | 4/2004 | Bijvoet | 705/26 |
| 2004/0083142 A1 | 4/2004 | Kozzinn | |
| 2005/0022708 A1 * | 2/2005 | Lee | 112/186 |
| 2006/0059054 A1 * | 3/2006 | Adiseshan | 705/26 |
| 2006/0218045 A1 | 9/2006 | Wagner | |
| 2007/0005174 A1 | 1/2007 | Thomas | |
| 2007/0022013 A1 * | 1/2007 | Tousignant | 705/22 |

* cited by examiner

| Type | Styles | Size Category | Available Size | Brand Image Criteria ||||||||| |
|---|---|---|---|---|---|---|---|---|---|---|---|---|
| | | | | Bust | Waist | Hips | Height | Sleeve | Inseam | Silhouette | Gender | Height/Inseam Ratio |
| Dresses | Style 1 | Regular | 2-4 | * | * | * | * | * | * | * | F | * |
| | | | 6 | 36-38 | 26-28 | 30-32 | 64-70 | Any | Any | HG, RT | F | Any |
| | | | 8-16 | * | * | * | * | * | * | * | F | * |
| | Style 2 | Regular | 0-4 | * | * | * | * | * | * | * | F | * |
| | | | 6 | 36-40 | 26-30 | 34-36 | 63-68 | 24-26 | 23-28 | HG, RT, T, R, O | F | 2.3-2.7 |
| | | | 8-12 | * | * | * | * | * | * | * | F | * |
| | | Tall | 6 | 36-42 | 26-30 | 34-36 | 65-72 | 26-28 | 25-30 | HG, RT, T, R, O | F | 2.2-2.8 |
| | | | 8-22 | * | * | * | * | * | * | * | F | * |

*FIG. 2B*

• Body Silhouette

○ Hour Glass    ○ Reverse Triangle    ○ Triangle    ○ Rectangle

• Body Silhouette

○ Oval    ○ Rectangle    ○ Triangle    ○ Hour Glass

VIRTUAL SIZING SYSTEM AND METHOD

CROSS-REFERENCE TO RELATED APPLICATIONS

This application claims the benefit of U.S. Provisional Patent Application No. 60/763,153, filed on Jan. 27, 2006, and entitled "VIRTUAL FIT SYSTEM AND METHOD," and U.S. Provisional Patent Application No. 60/713,938, filed on Sep. 1, 2005, and entitled "VIRTUAL SIZING TOOL," both of which are incorporated herein by reference in their entirety.

FIELD OF THE INVENTION

The present invention relates generally to data processing and, more particularly, to systems and methods for selecting, ordering, or furnishing apparel for individual members of a group such that the group members are dressed to project a commonly-governed image.

BACKGROUND OF THE INVENTION

One of the most valuable assets of a modern business, especially of a service provider, is its good will. Good will represents the public's positive perception of the business's reputation, products, or services in terms of its ability to generate revenue for the business, or to provide the business some advantage in the relevant marketplace. Naturally, businesses invest in a variety of branding strategies to develop their good will. Likewise, maintaining and promoting the positive image of existing brands is crucial.

For businesses that employ workforces that regularly interact with customers (such as airline flight attendants or gate agents) or a workforces having members that are simply visible to customers (such as package delivery personnel), the appearance of the workforce members is important to the brand image. To this end, workforces typically wear uniforms that are supplied to them by a uniform provider.

Outfitting a large workforce with uniforms can be quite challenging. For example, unlike in a consumer apparel shopping scenario, in which individual shoppers in department stores or online are generally free to select clothing for themselves among a wide variety of apparel types, styles, and sizes, without external time constraints, a uniform supplier provides a limited selection of uniforms of a specific type, having a limited number of styles and a limited number of standard sizes, and must supply the uniforms to a potentially large number of employees in a limited timeframe. This is especially true in situations when a company is switching to a new type of uniform as part of a new branding campaign. In this situation, the entire workforce must be re-outfitted by a specific launch date. This includes determining what uniform sizes to manufacture for the workforce, determining what type and size of uniform is suitable for each employee in accordance with the brand image, delivering the appropriate uniform to each employee, optionally verifying correct selection and fit, and handling returns, re-fits, and other special cases. Another concern of uniform providers is the need to supply uniforms to all employees, without exception, including accommodating unusual sizes, maternity status, allergies, religious requirements, and physical disabilities. Management of these exceptions is difficult and costly.

Moreover, the appearance of the uniforms, as worn by the members of the workforce, must comply with the brand image of their employer. Individual employees have unique body shapes and sizes, as well as individual tastes and preferences. There is an ever-present risk that certain employees might select a uniform that is inappropriate in terms of brand image, such as too loose, too tight, or in a style that does not conform to their body shape according to the brand image. These considerations must be balanced with the need to provide uniforms to the members of the workforce that they will enjoy wearing. Ultimately, the overall morale of the workforce plays a large part in the its ability to provide quality service and convey the proper brand image; and any displeasure towards wearing the uniforms experienced by members of the workforce can be a significant contributor to morale problems.

Conventionally, uniform providers supply uniforms that are pre-ordered by the employees. Ordering can be accomplished by catalog or online; however, employers prefer to control what type and size of uniform each employee selects for himself or herself. As a result, catalogs can include size charts that limit available styles and sizes for certain body dimensions. Each employee must find his or her measurements on the size chart, and determine the corresponding uniform size to order. This scheme provides little or no policing of proper fit in accordance with the brand image.

Employers can organize fit clinics at which employees have an opportunity to try on various uniforms to determine the best fit and best style (if there is a selection of available styles). Also, consultants can be on-hand at the fit clinics to advise employees as to what fit complies with the brand image. For large workforces that are distributed over a large geographic area, it is difficult and expensive to administer such fit clinics for example, due to the difficult for each of the employees to reach a fit clinic to determine their best size. In addition the timeline is tight to meet the customer expectations for launch.

In uniform change-over situations, to expedite the process, uniform providers need to begin production of the uniforms prior to the fit clinics and often determine the sizes of garments based on historical trends. This method is imprecise and may be out-dated as fashion trends change rapidly. Because orders for manufacture conventionally need to be placed early (such as before conducting the fit clinics), it is often impractical to collect employee comments and conduct surveys.

In view of these, and other numerous challenges of outfitting a workforce with uniforms, a solution is desirable for expediting the selection and sizing, ordering, and related processes, while enabling employers to promote and manage their brand images.

SUMMARY OF THE INVENTION

One aspect of the present invention is directed to selecting, ordering, or furnishing apparel for individual members of a group such that the group members dressed to project a commonly-governed image. This commonly-governed image can be used to provide for coordination of appearance across individual members of the group. A set of image criteria (such as brand image criteria, or virtual fashion consultant) associates a set of apparel specifications with corresponding body properties according to a desired image to be maintained for the group. The set of apparel specifications can include garment size, garment dimension, garment type, and/or garment style. The body properties can include one or more physical attributes, such as gender, at least one body dimension, body type classification, body shape classification, body silhouette classification, and ratio of body dimensions. The image criteria can also associate various uniform types or styles or according to certain relationships. For example, the image criteria can associate a first range of sizes of a first garment with a second range of sizes of a second garment.

Virtual sizing sessions can be conducted with participating members of the group via an interactive virtual sizing application interfaced with a computer network, including automatically gathering user-specific information from a set of users over the computer network. The user-specific information can include various types of information, such as at least one body measurement, body type selection, a body shape selection, body silhouette selection, style preference, fit preference; a preference based on selected famous brand apparel, material allergy information, maternity status, and special need.

Information can be gathered by presenting users with a sequence of information prompts including a first information prompt and a second information prompt that is subsequent to the first information prompt. The second information prompt can provide an offering of selectable options, such that the selectable options provided in the offering are based on information provided in response to the first information prompt and on the image criteria. For example, the first information prompt can be for a fit preference, and the second information prompt can provide an offering of a plurality of body silhouette options.

The user-specific information obtained from the one or more information prompts is processed to obtain a set of virtual sizing results. The processing can be based on the image criteria. Each of the vital sizing results can also include at least one result type selected from the group consisting of: apparel size determination; apparel size selection recommendation for the first participating member; apparel type selection recommendation for the first participating member; a recommendation to adjust a preference entry in order for the first participating member to comply with the image criteria; an indication that virtual sizing has failed; and an indication that the first participating member requires further apparel fitting service. Different participating members of the group can have different items in their corresponding virtual sizing results. The user-specific information can also include a combination of objective facts about each user from the set of users and subjective preferences of each user. Apparel size selection can be produced as part of the virtual sizing result that substantially accords with the objective facts about the first participating member of the group, and that accommodates the subjective preferences of participating members of the group to an extent that is consistent with the image criteria.

The user-specific information can include a first type of user-specific information and a second type of user-specific information that are at least partially overlapping at respective overlapping information portions. They can be compared to evaluate informational consistency of the respective overlapping information portions, and against an acceptable range of consistency for the overlapping information portions.

The first virtual sizing results can be transmitted over the computer network for display to the participating members of the group. The display can include a graphical image of a garment according to the first virtual sizing result worn by a virtual model having body properties based on the user-specific information from each corresponding participating member of the group.

The system and method can interactively schedule a style session for participating members of the group over the computer network. Optionally, the scheduling is based on their respective virtual sizing results. For example, members of the group having the same sizes could preferably be scheduled to attend different style sessions to avoid having to share the same limited resources at the style session concurrently.

Also, the system and method can facilitate ordering apparel for the participating members of the group based on the virtual sizing results. The virtual sizing results can be provided to the manufacturer of apparel such that the apparel can be fabricated based on the virtual sizing results. The virtual sizing results can also be useful for generating apparel requirements forecasting, for selecting future apparel designs, and for related other planning purposes.

The system and method can maintain a user profile for each participating member of the group. Also, a set of user account records can be maintained and configured with employment information specific to each participating member of the group. A group account specific to each different group can be established. Administrative access to a corresponding image authority for each group can facilitate the establishing of the image criteria and other configuring.

A system for managing apparel needs for the group, according to one aspect of the invention includes a network interface that communicates information over a computer network, a set of group-specific data, including image criteria that associate a set of apparel specifications with corresponding body properties according to an established image, and a virtual sizing application communicatively coupled with the network interface and the set of group-specific data. The virtual sizing application automatically gathers user-specific information over the computer network, and generates a virtual sizing result based on the user-specific information and the image criteria.

Optionally, the system includes a style session scheduler communicatively coupled with the virtual sizing application that automatically interactively schedules a style session appointment over the computer network based on the virtual sizing result. Also, optionally, a customer servicer can be communicatively coupled with the virtual sizing application, that facilitates interactive order placement for apparel over the computer network. Furthermore, a statistical data analyzer can be communicatively coupled with the virtual sizing application that facilitates gathering of a plurality of virtual sizing results.

BRIEF DESCRIPTION OF THE DRAWINGS

FIG. 2B illustrates an example set of brand image criteria associated with a portion of the uniform options depicted in FIG. 2A.

DESCRIPTION OF THE PREFERRED EMBODIMENTS

One aspect of the present invention is directed to selecting, ordering, or furnishing apparel for individual members of a group such that the group members are dressed to project a commonly-governed image. This commonly-governed image can be used to provide for coordination of appearance across individual members of the group. Embodiments of the present invention can be of particular value to groups that are distributed over a large geography, where it is impracticable to provide apparel selection or sizing guidance to every group member. One example of such a group is a uniformed workforce, including, but not limited to, workforces in the commercial, light and heavy industry, service industry, entertainment industry, athletic teams, bands and other school performing groups as well as scientific/academia sectors. Another example of a group having members that are dressed to project a commonly-governed image is a group of consumers desiring to wear apparel of a certain style, such as, for example, apparel from a particular fashion designer. The term "commonly governed image" as used herein refers generally to an image or appearance that is administered, controlled, defined, guided, etc., by at least one common authority, manager, designer, decision maker, advisor, or the like, and should not be limited by the embodiments described for illustration below.

Persons of ordinary skill in the relevant arts will appreciate that the group and the commonly-governed image can each relate to a variety of respective wearers of apparel and images to be projected. However, for illustrative purposes, certain embodiments of the invention that are described below are presented in the context of a uniformed workforce, where the uniforms to be worn by the workforce are intended to project a certain brand image. Other embodiments are described in the retail context where, the apparel is clothing for personal use, and where the image criteria is implemented as a virtual fashion consultant that can accept, to a certain degree, input from customers.

Figure 1:
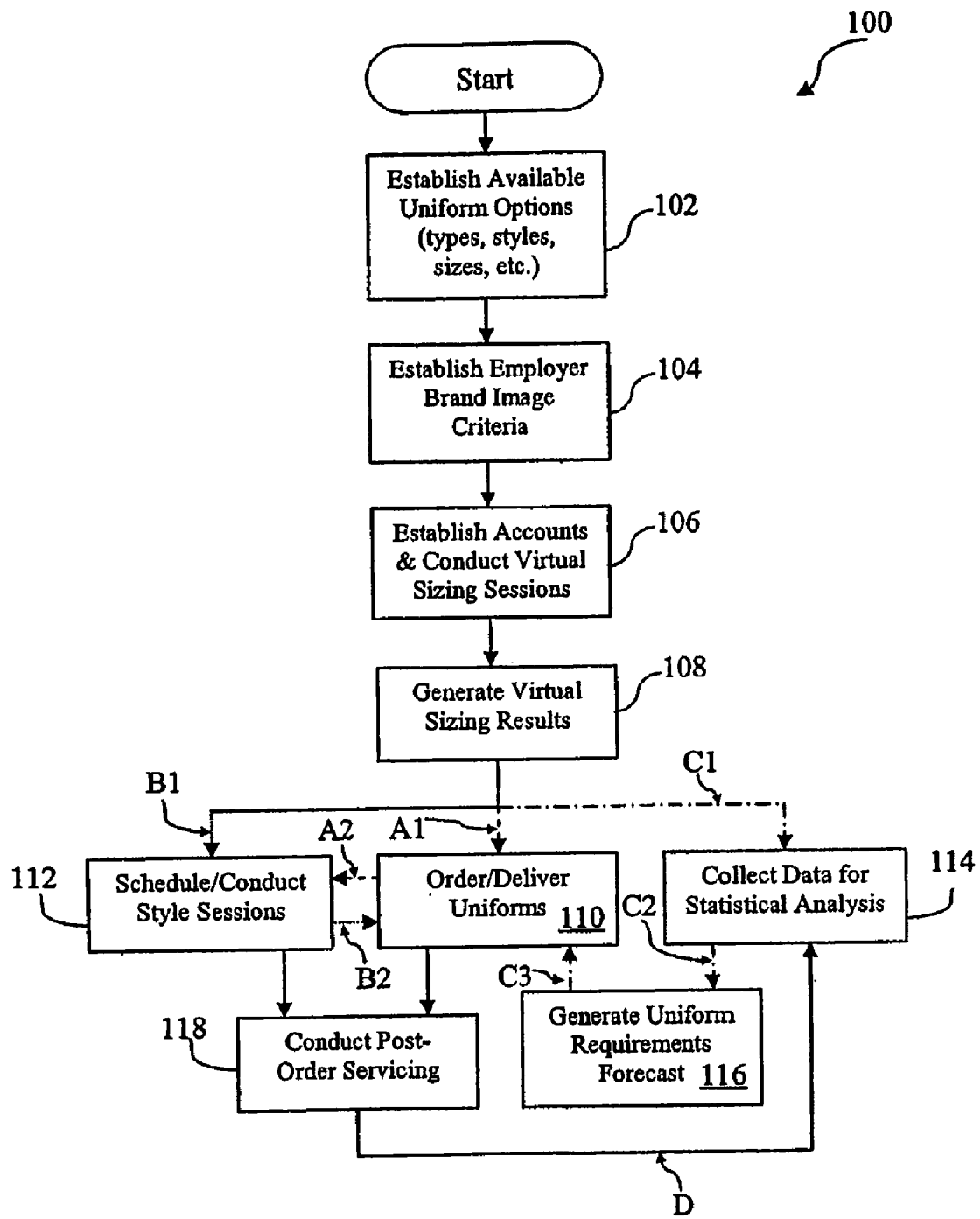
FIG. 1 is a top-level flow diagram illustrating examples of conducting and utilizing virtual sizing sessions for managing a uniform program for a workforce according to one embodiment of the invention.

FIG. 1 is a flow diagram depicting an example method 100 according to one embodiment. Beginning at step 102, the uniform provider works with its customer, which is typically an employer of a work force, to establish a set of uniform options to be offered to members of the work force. Typically, the employer will have selected various pieces of apparel to be worn by uniformed employees of each position, or work function. For example, where the employer is an airline, pilots will have a first set of uniforms, flight attendants will have a second set of uniforms, gate agents will have a third set of uniforms, and so on. For each position and each gender, employers will offer various types of garments as well as various styles. For example, if a male employee's uniform is a two-piece suit, available garment types can include blazers and trousers and for cash garnet type there may be multiples styles such as, for example, single verses double-breasted blazers, and pleated verses non-pleated trousers. Each type of garment or each style of garment may be offered in a certain range of sizes or configurations.

At step 104, the uniform provider and employer establish the employer brand image criteria. The brand image criteria are a set of rules that are intended to control, to some extent, how the employees ought to appear in their uniforms. The need for having the brand image criteria arises from the fact that the work force consists of individual persons, each of whom has a unique body shape or physique. Additionally, individuals have different tastes for fashion. Certain employees may prefer to wear tight-fitting clothing, while others prefer a more loose fit. However, to project the desired image for its brand, the employer has a need to define and enforce a set of uniform-wearing guidelines for its employees. The brand image criteria serve this purpose by associating employee body types and sizes with acceptable uniform attributes, such as size, style, or color.

In one embodiment, the available uniform options are represented by data maintained in a data base, and the employer brand image criteria are implemented as a set of logical tests or relationships that operate on data.

At step 106, individual employee accounts are established for the participating members of the work force and virtual sizing sessions are conducted. In each virtual sizing session, the participating work force member, or employee, responds to an interactive survey, or questionnaire, which collects relevant information needed to, at a minimum, properly size a uniform to fit the employee in a way that is consistent with the brand image criteria. Preferably, each virtual sizing session is conducted by a computer-based virtual sizing application that is administered over a computer network including, but not limited to, the internet.

After conducting each of the virtual sizing sessions, the virtual sizing application generates a corresponding virtual sizing result, as indicated at step 108. Generating the virtual sizing result includes processing the information gathered during the virtual sizing session at 106, and applying the brand image criteria established at step 104 to produce one or more of a variety of results. The virtual sizing result can take many forms within the spirit of the invention, such as, for example, a size determination for a particular type of uniform, a listing of available uniform types and recommended sizes for each, an indication that additional information or further sizing is needed, an indication or explanation of potential causes of non-compliance with the brand image criteria, and the like.

After obtaining each of the virtual sizing results, a variety of subsequent steps may be taken that utilize the virtual sizing result for each participating member of the work force. For example, as depicted in method 100, a style session can be scheduled and conducted for each employee, or for certain employees only as indicated at step 112. The virtual sizing result can be use for style session planting purposes. For example, the virtual sizing result can be used for making sure that uniforms of the appropriate size are available at the style session for a specific employee. It can be advantageous to schedule multiple employees to attend a style session location simultaneously when those employees have different uniform size requirements. This will enable keeping a limited number of uniforms on hand for the style sessions such as one uniform of each size range. Employees of different sizes attending simultaneously will each be able to try on a uniform of an appropriate size without having to wait for another employee to finish trying on a uniform of their size. This can significantly reduce bottlenecks at the style sessions and improve throughput.

The virtual sizing result can alleviate the need for conducting style sessions across the board. Employees for whom the virtual sizing result suggests a high likelihood of proper uniform fit may be permitted to order uniforms of the determined sizes without further review by a fashion consultant. In the case of other employees for whom their virtual sizing result suggests only a marginal likelihood of compliance with the brand image criteria, the virtual sizing application can require these employees to attend a style session.

The virtual sizing results can also be used to determine the types and the quantities of uniforms to order. For example, after virtual sizing results have been obtained for a majority of the work force, the virtual sizing results can be aggregated and analyzed to determine the style preferences and uniform size distribution that is characteristic of the particular work force. The flow diagram of method 100 illustrates various example paths that can be taken after the virtual sizing results have been obtained. As indicated at path Al, uniforms can be ordered and delivered as indicated at step 110 based only on the virtual sizing results and on the employee's order selections. Scheduling and conducting the style sessions at step 112 is an optional step that can be performed by following path A2. Alternatively to following paths Al/A2, the style sessions can be scheduled and conducted at step 112 prior to ordering or delivering uniform (step 110) by following paths B1/B2.

As indicated at step 114, data can be collected for statistical analysis by following path C1. The statistical analysis can be used to generate a forecast for the uniform requirements as indicated at step 116 by following path C2. From the forecast, the uniforms can be ordered and delivered at step 110 following path C3. As depicted in FIG. 1, paths A1, B1, and C1 can be followed either sequentially or in parallel.

Following the order or delivery of uniforms at step 110, or following the post-delivery style sessions at step 112 via path A2, some employees may require additional servicing as represented by step 118. The post-order servicing can include alterations, returns, and the like. As represented by path D, statistical data can be gathered based on the post-order servicing, which can enable the uniform provider to improve future service based on the knowledge obtained through the post order servicing 118. According to one example embodiment, post-order servicing records generated at step 118 are associated with the virtual sizing results generated at step 108 for each employee. This data association can be useful for recognizing instances when an employee ordered or received a uniform inconsistent with the uniform recommendations generated in the virtual sizing result.

Figure 2A:
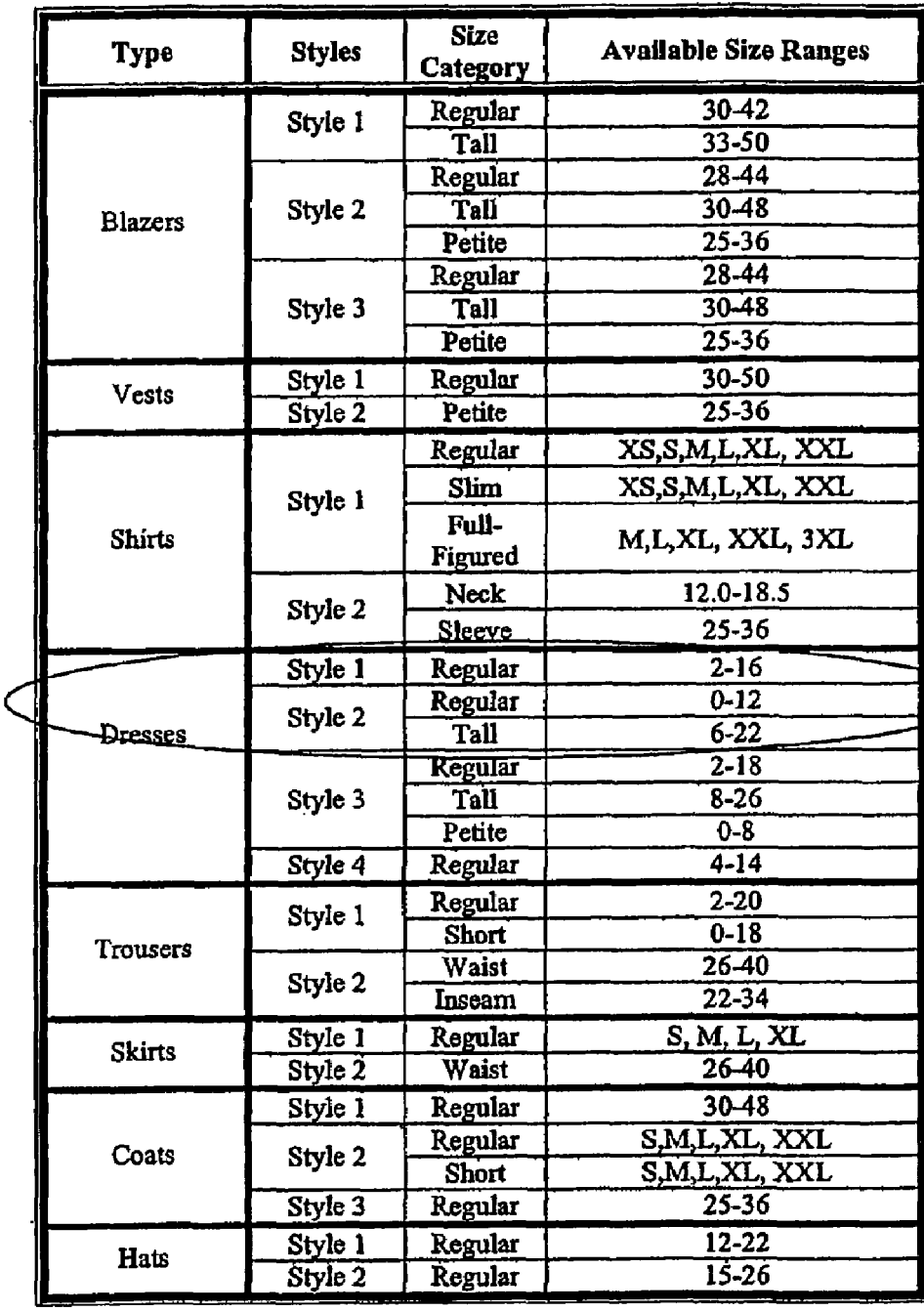
FIG. 2A illustrates an example of a set of available uniform options, including various uniform types, styles, size categories, and size ranges.

FIG. 2A illustrates an example set 200 of selectable uniform options. Selectable option set 200 includes multiple types of uniform garments, namely, blazers, vests, shirts, dresses, trousers, skirts, coats, and hats. For each uniform garment type, there can be one or more style. For example, there are three styles available for blazers in selectable option set 200. For each style there can be different size categories. For example, shirts, style one is offered in regular, slim, and full-figured size categories. Each size category can have a unique range of available uniform sizes, as depicted in FIG. 2A.

A portion 202 of selectable option set 200 related to style 1 and style 2 of dresses shall be used illustratively to describe an example embodiment of brand image criteria. FIG. 2B illustrates an example set of brand image criteria 204 associated with portion 202 of selectable option set 200 for uniforms. For each available size of uniform, brand image criteria 204 defines acceptable values for employee attributes 206 for which the corresponding uniform size is in compliance with the employer's brand image. User attributes 206 include body dimension ranges for bust, waist, hips, height, sleeve length, and inseam length. In a related embodiment, size ranges that are part of the brand image criteria can be defined in terms of a nominal size and a pair of high/low tolerances.

Employee attributes 206 also include a silhouette classification, a gender classification, and a combination of other employee attributes such as height to inseam ratio. In other embodiments, brand image criteria 204 can include other employee-specific information gathered during the virtual sizing session, or derived from information gathered during the virtual sizing session, such as "normally wear" sizes from brand name apparel, fit preferences, and the like. For illustrative purposes, examples of employee attribute values are presented for size 6 of dresses, style one, regular, and dresses, style two, regular, and tall, indicated respectively at 206a to 206b and 206c. Example employee attribute values for sizes other than 6 have not been provided in this description for the sake of simplicity. However, brand image criteria 204 generally includes employee attribute values for each size. As depicted in FIG. 2B, brand image criteria for certain sizes of certain styles can include broader or narrower ranges. For example, employee attribute set 206a has sleeve, inseam, and height/inseam ratio employee attributes that are non-limiting.

According to one embodiment, for a particular garment size, there are defined primary and non-primary body measurement ranges. For example, a particular blazer size can have primary ranges defined for a chest measurement and a shoulder measurement and a non-primary ranges defined for a waist measurement and hips measurement. The hierarchical arrangement of the various body measurements is useful for applying the brand image criteria to achieve a virtual sizing result, as described below.

The brand image criteria 204 for portion 202 of selectable option set 200 is indicative of how style 1 and style 2 of the dresses are intended to fit the employee according to the employer's requirements. For example, style one of the dresses is a tighter-fitting dress intended to be worn by women who are generally physically fit and tend to have a more athletic body type. Consistent with this criteria, size 6 of style one dresses is limited to persons having either hourglass or reverse triangle silhouette classifications and who normally wear size 4 to 6 dresses. By contrast, style two dresses have more conservative styling than style one dresses, have a looser fit, and are intended to be worn by a more diverse segment of female employees. Accordingly, style two is available for women having hourglass, reverse triangle, triangle, rectangular, and oval body silhouette classifications. However, because style two is a dress having a different fashion than style one, style two dresses for sizes 6 regular and 6 tall are limited to women having the specified height/inseam ratios, whereas style one dresses are not limited by the height/inseam ratio of the employee.

In a related embodiment, the brand image criteria can associate uniform garments. For example, referring again to FIG. 2A, the garment type Blazers, Style 1, Regular can be associated by the brand image criteria with Trousers, Style 1, but not with Trousers, Style 2. In this regard, the brand image criteria can be used to control the combinations of garments that an employee can own, and therefore potentially wear. Thus, in this example, the brand image criteria can prevent the employee from wearing Trousers, Style 2, with Blazers, Style 1, Regular. While this example is a coarse regulator of what combinations of garments a certain individual is authorized to wear, associating each garment with a set of types and styles of uniform garments and corresponding specific size ranges, can enable the brand image criteria to prevent certain size, color, or fabric mismatches.

Figure 3A:
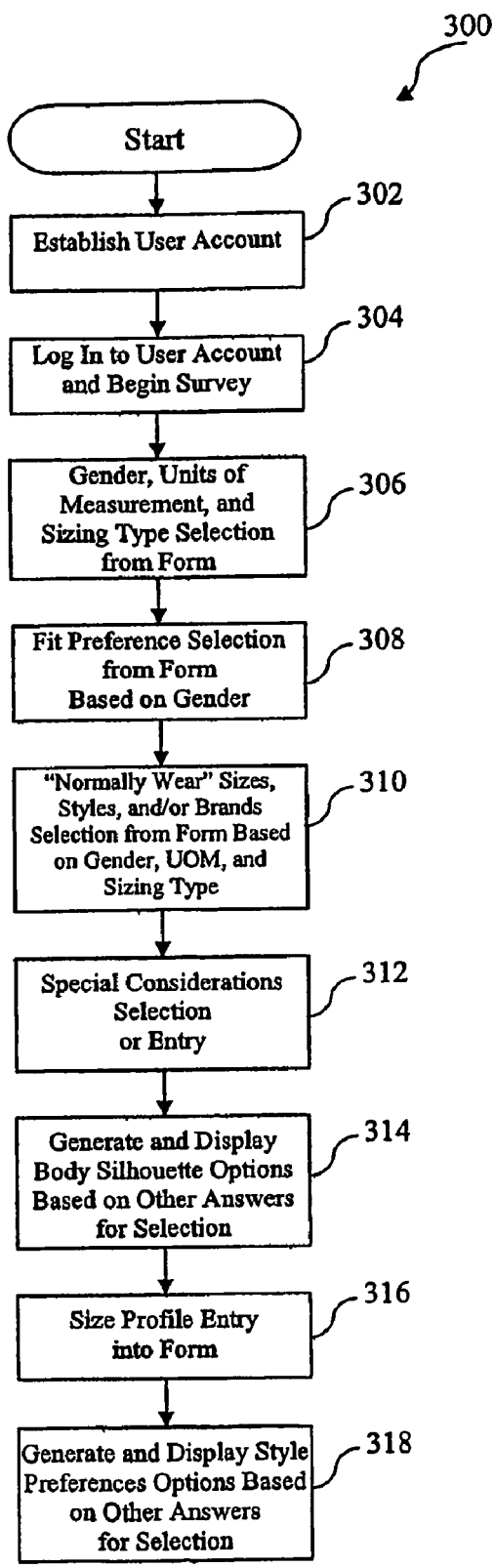
FIG. 3A is a flow diagram illustrating an example process of conducting a virtual sizing session according to one aspect of the invention.

FIG. 3A illustrates an example process 300 of conducting a virtual sizing session. Preferably, the virtual sizing session is conducted over a computer network such as the internet between a employee computer operated by the employee running a browser application, and a server computer operated by the uniform provider running the virtual sizing application. Before the employee can log in to begin the virtual sizing session, an account is established for the user-employee as indicated at step 302. The employee account is accessible by employee ID and password, which is provided to the employee off-line. The employee account can be configured with certain employee attributes that are accessible to an administrator, but not to the employee. For example, the employee account can include a data field that contains the employee's position or work function designation. Limiting an employee's access to this data field can be advantageous for security purposes such as, for example, permitting only airline pilots to size and order pilot's uniforms.

At step 304 the employee-user logs in to the employee account and the interactive survey is initiated. At step 306, the user responds to basic survey questions, the employee's gender, units of measurement (such as inches or centimeters), and sizing type (such as U.S. sizing, U.K. sizing or E.U. sizing). Preferably, such survey questions are provided in a web-based form, in which the user can select from a set of available options to answer the survey questions. At step 308 the virtual sizing application generates survey questioning related to the employee's fit preferences. Preferably, the fit preference questioning includes selectable options that are gender-specific based on the employee's previous gender indication at step 306. Examples of fit preference selectable options include:

Fit A: This is a missy fit and is for a mature body type with fuller hips and a shorter body length as compared to junior fit.

Fit B: This is a junior fit and is for a longer, athletic body with slim hips and a higher bust line.

Fit C: This is a woman's fit and is for a full figure and is often referred to as plus size.

At step 310, the virtual sizing application prompts the employee to enter "normally wear" clothing information. "Normally wear" clothing information can include various pieces of information related to the employee's ordinary dress. For example, in one embodiment, the employee is prompted to select their shirt size, dress size, or trouser size. In a related embodiment, the employee is given selectable options from which to select famous name brand clothing or clothing designers whose clothing products the employee prefers to wear. In another embodiment, the employee can be given more general selectable options such as style of clothing. Questions can be accompanied by graphics illustrating various articles of clothing. Preferably, the "normally wear" survey questioning is generated based on previous survey answers as to gender, units of measurement and sizing type of step 306.

Figure 3B:
FIGS. 3B and 3C illustrate various examples of selectable option sets.
Figure 3B:
Figure 3B:
Figure 3B:
Figure 3C:
Figure 3C:
Figure 3C:
Figure 3C:

At step 312, the virtual sizing application prompts the employee to enter or select any special considerations, including, any fabric allergies, maternity status, disability, and the like. At step 314, the virtual sizing application generates a set of body silhouette selectable options for selection by the employee. FIGS. 3B and 3C illustrate various examples of selectable option sets of body silhouettes. The body silhouette selectable options offered for the employee's selection are based on the employee's previous answers to earlier survey questions, such as "fit preference" selection of step 308, "normally wear" information of step 310, and any special considerations of step 312.

Referring, now to FIG. 3B, four body silhouette selectable options are presented to a female employee whose previous virtual sizing survey selections or responses suggest that the employee has a generally lean physique. Body silhouette selectable options include an hourglass silhouette, a reverse triangle silhouette, a triangle silhouette or a rectangle silhouette. FIG. 3C illustrates a different set of four body silhouette selectable options that are presented to a different female employee during a virtual sizing session. The second female employee answered the previous survey questions in a way that suggests her having a somewhat fuller figure than the first female employee of FIG. 3B. The second female employee's body silhouette selectable options of FIG. 3C are oval silhouette, a rectangular silhouette, a triangle silhouette, and an hourglass silhouette.

Figure 3D:
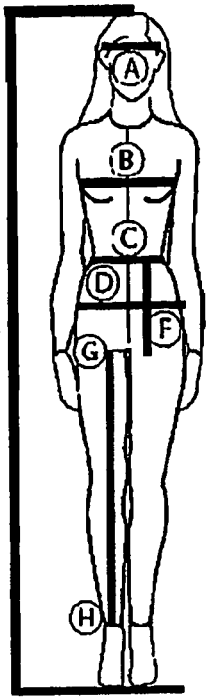
FIG. 3D illustrates one example embodiment of a size profile data entry form.

Referring again to FIG. 3A, at step 316, the virtual sizing application prompts the employee to enter the employee's size profile information into a data entry form. FIG. 3D illustrates one example embodiment of a size profile data entry form. The data entry form of FIG. 3D has been generated based on the employee's previous units of measurement selection and includes units of inches following each dimension entry field. The size profile entry survey questions are directed to hat size A, bust B, waist C, hips D, overall height E, rise F, inseam G-H and sleeve length. Optionally, the virtual sizing application can provide additional instructions on making the size profile measurements utilizing the web-based interactive display and employee interface.

Figure 3E:
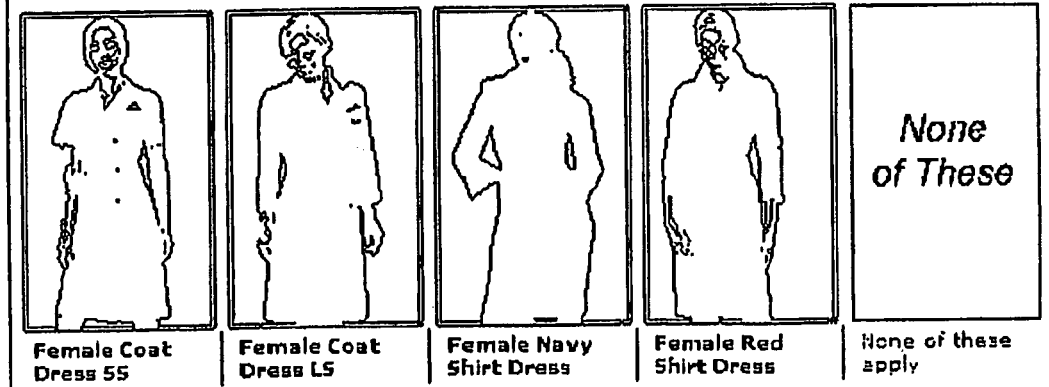
FIG. 3E illustrates an example of a set of style preference options.

Referring again to FIG. 3A, at step 318, the virtual sizing application generates and displays a set of style preference selectable options for the employee. FIG. 3E illustrates an example of a set of style preference selectable options for dresses. The selectable options are presented graphically as clickable hyperlinks. Preferably, the set of selectable options for style preference for each type of uniform is based on previous virtual sizing survey answers provided by the employee. In a related embodiment each style preference selectable option is generated to appear graphically on a computer-generated image of a model having the same or similar body attributes as the employee. For example, the virtual model can have body proportions that mimic those provided by the user. In another example embodiment, the virtual model is selected from a finite set of available body types, or templates, most closely matched to the employee's body type based on the user's previous survey answers.

Referring again to FIG. 3A, as the employee interactively answers each of the virtual sizing survey questions, the virtual sizing application populates corresponding database fields with the employee's answers. Preferably, these database fields containing the virtual sizing session records are associated with the employee's account previously established at step 302. In one embodiment, as the virtual sizing survey questions are answered by the employee, the virtual sizing application evaluates the answers according to a set of logical rules for internal consistency. For example, if a certain body dimension measurement appears to be out of range, the interactive virtual sizing application can issue a pop-up dialogue box with an error message for the employee.

Figure 4:
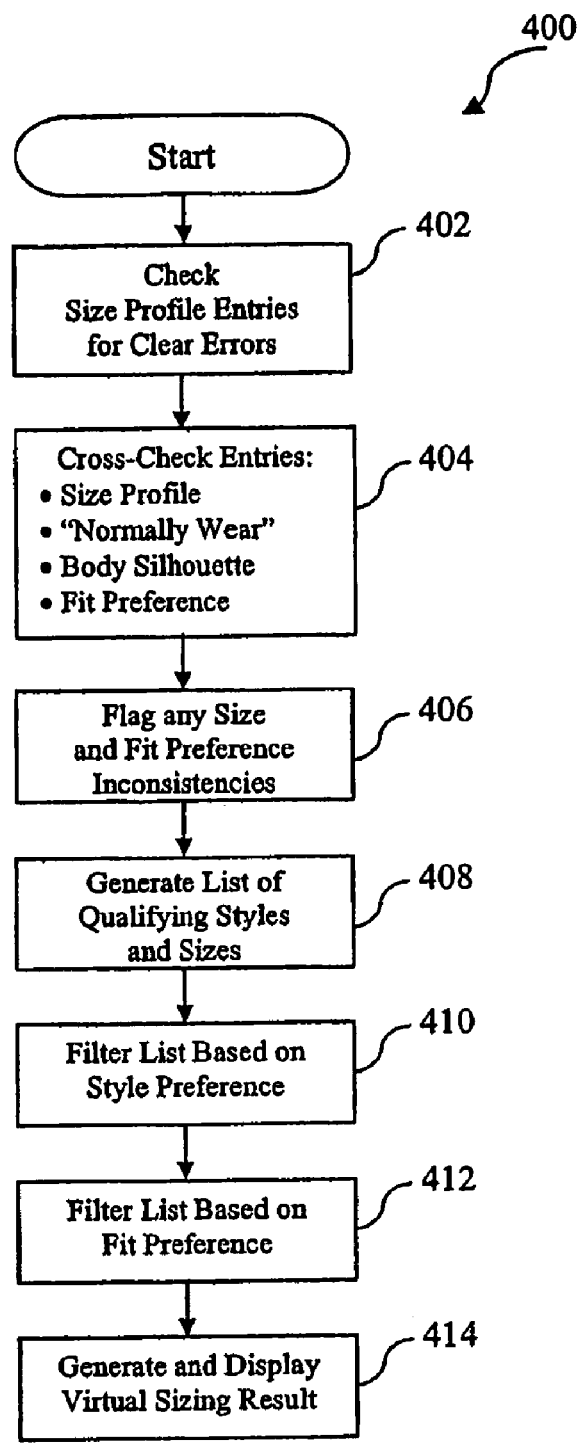
FIG. 4 is a flow diagram illustrating an example process of generating virtual sizing results following a virtual sizing session according to one aspect of the invention.

FIG. 4 is a flow diagram illustrating an example process 400 of generating virtual sizing results following a virtual sizing session. In a related embodiment, at least a portion of process 400 can be carried out concurrently, or in an interleaved manner with process 300 of conducting a virtual sizing session. Beginning at step 402, the virtual sizing application checks the size profile entries for any clear errors. This type of checking is similar to the logical tests described above that can be performed during the virtual sizing session. At step 404, the virtual sizing application conducts cross-checks among different types of virtual sizing survey answers to analyze the answer set for any internal inconsistencies.

Preferably, the different types of virtual sizing survey answers are at least partially overlapping in an informational sense. For example, body measurements and body silhouette have an overlapping informational component which is, namely, relative body proportion. Due to user error, misunderstanding, or attempt to mislead the virtual sizing survey, it is possible that one set of information is not consistent with another set of overlapping information. For example, the body measurements may not correspond with the selected body silhouette. The identified internal inconsistencies can be indicative of potential data entry errors by the employee or improper body measurement, or can be indicative of the fact that the employee has a distinctive or unusual dress tendency (such as wearing over-sized or under-sized clothing for their body type or size). Inconsistencies can be identified by cross-checking size profile entries, "normally wear" selections, body silhouette selection, and fit preference selections.

In one embodiment, the virtual sizing application rates internal inconsistencies by degree. Thus, for example, if an inconsistency is severe such that a nonsensical result is represented by the virtual sizing survey answers, the inconsistency is characterized as being of a high degree. On the other hand, if an inconsistency merely suggests that an employee has distinctive or unusual taste for wearing clothing a certain way, such an inconsistency can be classified as being of a relatively low degree. In a related embodiment, inconsistencies of a high degree are treated as being fatal to achieving a feasible virtual sizing result, and the virtual sizing application can prompt the employee to re-enter questionable survey answers. Internal inconsistencies of a low degree, however, while suggesting that the employee may not be fully amenable to complying with the brand image criteria, are not treated as being critical to the success of the virtual sizing session. At step 406, any size and fit inconsistencies are flagged for possible follow-up activity. Examples of follow-up activity include making attendance to a style session appointment mandatory for the employee.

At step 408, the virtual sizing application applies the brand image criteria to certain survey questions from the virtual sizing session to generate a list of uniform sizes and styles that are available to the employee and that are in compliance with the brand image criteria. The brand image criteria have been previously defined by a workforce administrator, marketing representative, outside consultant, or the like. Such individuals are collectively referred to herein as an image authority that has permission to view, define, or modify the brand image criteria.

In a related embodiment, the brand image criteria include portions that are user-accessible and non-user-accessible. In this embodiment, the users of the virtual sizing application (such as, for example, the participating members of the workforce or their agents or representatives authorized to act on their behalf) can view and potentially modify the user-accessible portion of the brand image criteria. However, the non-user-accessible portion of the brand image criteria remains non-viewable or non-modifiable by the users.

At step 410, the virtual sizing application applies the employee's style preferences to either reduce the available option set for uniforms or to highlight or emphasize certain styles of uniforms. At step 412, the list of available uniforms is further filtered by reducing or emphasizing the available option set based on the employee's fit preferences.

At step 414, the virtual sizing application generates a virtual sizing result that includes either a list of selectable options, or recommendations, of uniform types, sizes, and styles that conform to the brand image criteria for the specific employee. Optionally, different users can receive different virtual sizing results having distinct types of content. Users can receive different types of virtual sizing results based on their corresponding workforce, job function, gender, physical properties, indicated preferences related to uniforms, garment selections, and the like. For example, a first user can receive a virtual sizing result that assigns uniform sizes and styles, whereas a second user can receive a virtual sizing result that provides size recommendations. A third user can receive a virtual sizing result that requests the employee to attend a style session in person.

Any suitable set of logical rules or tests can be applied to generate an appropriate virtual sizing result. In one example embodiment in which a virtual sizing result includes a size determination for a particular garment, and in which the brand image criteria includes primary and non-primary body measurements, a set of logical rules can be as follows:

First, select an initial garment size that has primary dimensions matching the corresponding primary body measurements such that the garment fits within the allowable tolerances (i.e., both the "plus" and the "minus" tolerances) for each of the primary measurements. The selected initial garment size will have other, non-primary, dimensions that correspond to non-primary body measurements.

Next, compare the non-primary dimensions of the selected initial garment size against the corresponding non-primary body measurements. Generally, the non-primary dimensions will have a greater fit tolerance than the primary dimensions.

If any non-primary dimension is out of tolerance with respect to its corresponding non-primary body measurement, then the selected garment size is considered unacceptable, and a different garment style or type can be recommended.

If all of the non-primary dimensions of the selected initial garment size are within the "minus" tolerance range with respect to their corresponding non-primary body measurements, then the selected initial garment size is returned as the determined garment size.

If any one of the non-primary dimensions of the selected initial garment size are within the "plus" tolerance range with respect to their corresponding non-primary body measurements, then a larger garment size relative to the selected initial garment size is returned as the determined garment size. The tolerance ranges associated with the non-primary measurements can be further categorized into "upsize" steps. Based on the number of "upsize" steps needed to represent the difference between the non-primary body measurement and its corresponding dimension of the selected initial garment size, the size increase for arriving at the larger garment size can be determined.

At least a portion of the virtual sizing result is displayed to the employee. A portion of the virtual sizing result can also be maintained in association with the employee's employee account but inaccessible to the employee. At least a portion of the virtual sizing result can also be passed to another application, such as a style session scheduler, a statistical data analyzer, a uniform ordering system, the employer's human resources department, and the like.

In a related embodiment, the virtual sizing application can be used primarily as a survey tool for purposes that include establishing the brand image criteria, selecting or developing uniform styles and other options, or forecasting future uniform orders. In this embodiment, the brand image criteria can be applied less strictly, or not at all. For example, the brand image criteria can be used to filter the available selectable options for employees based on certain body characteristics. However, for primarily survey purposes, the virtual sizing application could generate an output result that would otherwise be non-compliant with the brand image criteria.

In a related embodiment, for survey purposes, the brand image criteria can be altogether omitted from the information gathering of the virtual sizing session. The information generated from a wide-open option set for all employees might return a result that suggests a significant portion of the workforce prefers certain size/style configurations that would be inconsistent with the brand image. An employer might use such information to re-design the uniform offerings to include styles that accommodate the preferences of this portion of the workforce while remaining consistent with the brand image. Alternatively, an employer might utilize such survey information to re-evaluate, and possibly modify the brand image criteria.

Figure 5:
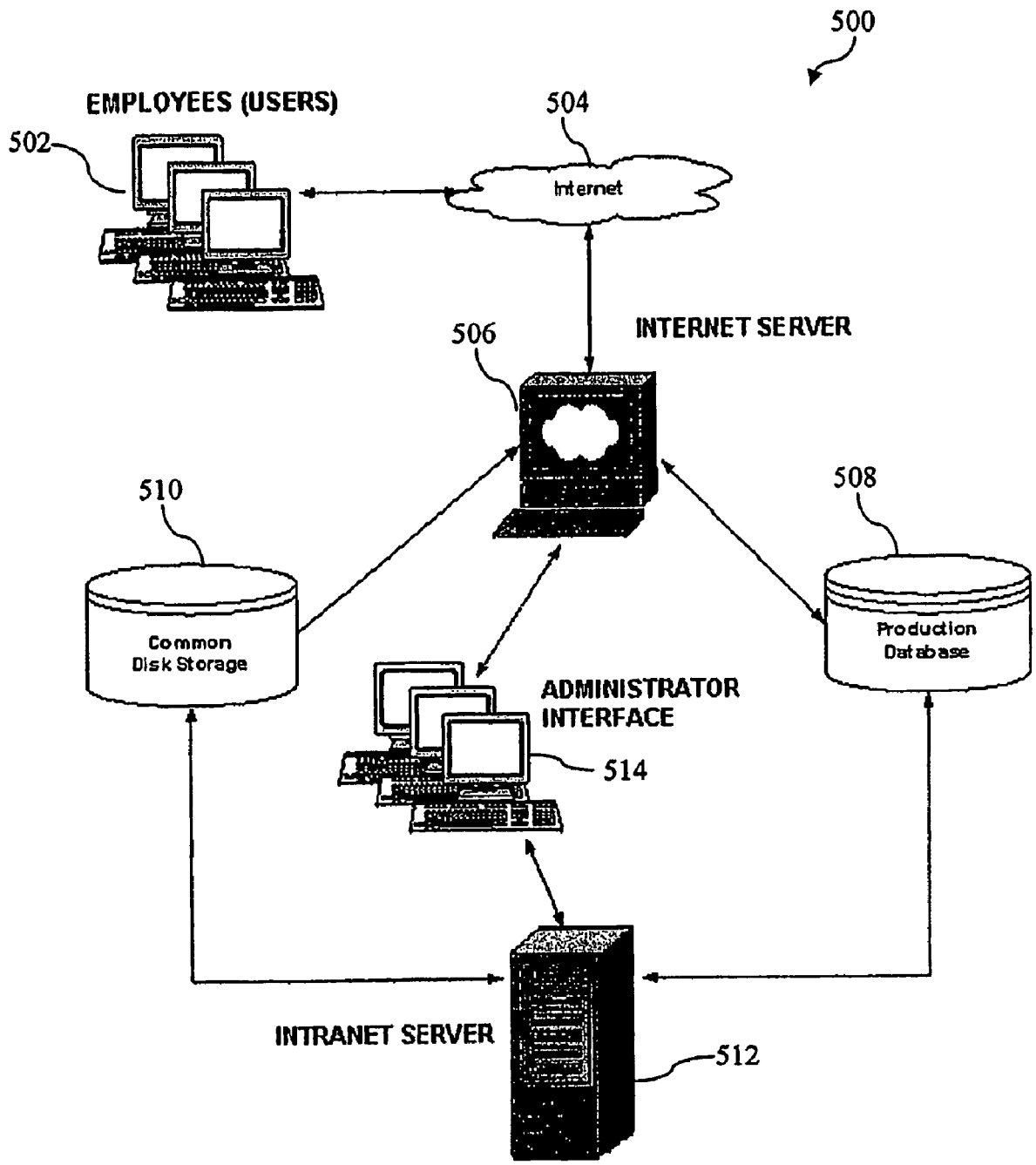
FIG. 5 is a diagram illustrating an example system in which a virtual sizing application can be implemented according to embodiments of the invention.

FIG. 5 illustrates an example system in which the virtual sizing application can be implemented, and which can facilitate conducting the virtual sizing session with each participating member of the work force. Each employee, or user, can utilize any suitable computer having access to internet 504 to access the virtual sizing application via web browser software. The uniform provider operates internet server 506 that manages communications sessions with each of the employees or employee's 502. Also, internet server 502 executes the virtual sizing application. In one embodiment, the virtual sizing application accesses the survey questions from, and populates data fields in, production data base 508. Common disc storage 510 stores virtual sizing application program instructions, images, and related data.

To facilitate system development, maintenance, and customer service, an intranet server 512 is interfaced with production database 508 and 510. For development, an off-line virtual sizing application can be run on intranet server 512. A maintenance application can run on intranet server 512 that permits establishment of new employee accounts, new workforce accounts, management of all available uniform specifications, brand image criteria, virtual sizing survey questions, records of answers to virtual sizing surveys, virtual sizing application code (including logical rules, articulation of survey questions, graphics, and all other relevant administrative items). Intranet server 512 can also interface with or execute at least a portion of the on-line virtual sizing application while permitting a customer service provider to help users complete their virtual sizing sessions (such as, for example, in the telephone support context). Administrator interface 514 can communicate selectively with internet server 506 or intranet server 512 to permit the uniform provider to monitor, maintain, reconfigure, or use system 500.

In a related embodiment, system 500 can also run related applications, such as sizing sessions scheduling, statistical analysis, order placement, customer accounting, and the like. Processing of these applications can take place, as appropriate, at internet server 506 or intranet server 512.

Figure 6:
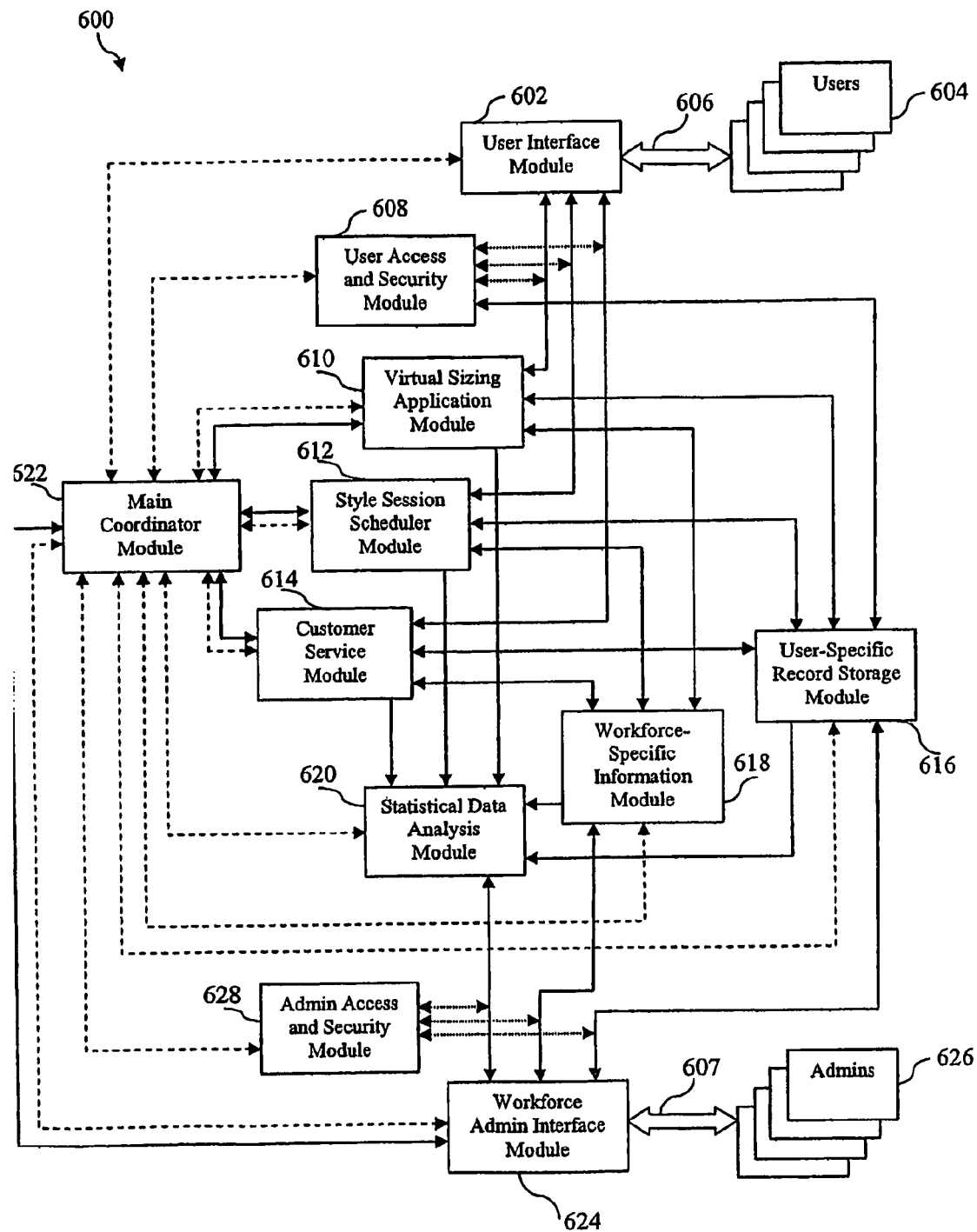
FIG. 6 is a block diagram illustrating an example system of software modules according to one embodiment of the invention.

FIG. 6 is a block diagram illustrating an example system 600 of software modules according to one embodiment. The software modules are interfaced with one another via data interfaces (solid lines), control interfaces (dashed lines) and security interfaces (dotted lines). The data interfaces exchange substantive data concerning various transactions and interactions with users or administrators. The control interfaces exchange information related to the operation of system 600, including coordinating the functions of the various modules. The security interfaces limit access via certain data interfaces. The arrows represent the direction of information flow for each corresponding interface.

User interface module 602 communicates with one or more users 604 via computer network 606. User interface module provides an interactive graphical interface, such as via web browser. Access to system 600 is limited by user access and security module 608, which validates each one of users 604 prior to granting access to the system. System 600 features virtual sizing application 610, which conducts the interactive virtual sizing sessions with each of users 604 via user interface module 602, and generates the virtual sizing results.

Style session scheduler module 612 conducts interactive scheduling with each of the users 604 via user interface module 602 to plan attendance of the style sessions following generation of the virtual sizing result for each respective user 604. As described above, preferably, style session scheduler module 612 helps to optimize the available resources at each style session by scheduling certain users to attend the style sessions relative to other users based on the virtual sizing result of each user.

Customer service module 614 conducts order placement for uniforms and accessories, and handles billing and delivery arrangements. Preferably, customer service module 614 provides an interactive shopping cart-style look-and-feel. Customer service module 614 can also coordinate certain after-the-sale transactions, such as processing returns and arranging contact with a live customer service representative.

Each of the virtual sizing, style session scheduler, and customer service modules 610, 612, and 614, respectively, are interfaced with user-specific record storage module 616, workforce-specific information module 618, and statistical data analysis module 620. User-specific record storage module 616 is further interfaced with user access and security module 608. User-specific record storage module 616 maintains a database having user account records. The user account records include, for each user, account access information, such as account ID and password, user profile information (such as language preference, address, billing information, and the like), information assigned to each user by the employer (such as job title and uniform allowance budget), user-specific information obtained through the virtual sizing sessions (such as sizes, preferences, virtual sizing results, and the like), as well as historic records of earlier virtual sizing results and purchasing transaction history. In one embodiment, the user-specific records include a "public" portion accessible for display to the user, and a "private" portion accessible only to the employer or administration of system 600.

Workforce-specific information module 618 maintains a database of information related to the workforce employer's account with the administration of system 600. System 600 can accommodate different employer accounts, which would each service a different workforce. Each workforce can have a different set of uniforms, different brand image criteria, different levels of uniform supplier services, and the like. Accordingly, workforce-specific information module, for each workforce, maintains the uniform offerings and pricing, virtual sizing survey questions, brand image criteria for each type of employee, virtual sizing result formulas, style session scheduling information, customer service information, and the like. Workforce-specific information module 618 can also maintain employer representative accounts for information access and management of the workforce user accounts, as well as brand image criteria and other employer-controllable parameters.

Statistical data analysis module 620 receives information from virtual sizing application module 610, style session scheduler module 612, customer service module 614, user-specific record storage module 616, and workforce-specific information module 618. Statistical data analysis module 620 gathers selected items of information produced from operation of the processing modules, and queries stored data in the database modules, and aggregates the data to generate reports for use by the system and workforce administrators.

Main coordinator module 622 interfaces with each of the modules for control purposes, as well as for certain data exchange purposes, as illustrated in FIG. 6. In one embodiment, main coordinator module 622 is a main program routine, while each of the modules is a sub-routine called by the main routine. In another embodiment, main coordinator module 622 is a monitoring subroutine that ensures proper information flow and coordination between modules.

Workforce admin interface module 624 provides an interface for workforce or system administrators to access system 600 with various degrees of privileges for monitoring operation of system 600, changing or updating the operating parameters of any of the modules, interactively using system 600 on behalf of an employee unable to access the system conventionally via user interface module 602, accessing and configuring statistical data analysis module 620, and the like. Workforce or system administrators 626 can access workforce admin interface module 624 via network 607, which can be the same network as network 606, or a different network. Admin access and security module 628 controls administrator access and permissions via workforce admin interface 624. In one embodiment, admin access and security module 628 is integrated with user access and security module 608.

In one embodiment, as depicted in FIG. 6, workforce admin interface module 624 has a data interface directly with user-specific record storage module 616, workforce-specific information module 618, and with statistical data analysis module 620; however, workforce admin interface module 624 exchanges data with virtual sizing application module 610, style session scheduler module 612, and customer service module 614 via main coordinator module 622. This type of arrangement can permit the administrator to monitor or interact with system 600 while system 600 is interactively servicing users 604.

EXAMPLES OF RETAIL APPLICATIONS

In the retail context, the image criteria can be implemented as a virtual fashion consultant. Whereas the brand image criteria are designed to protect an employer's goodwill, the virtual fashion consultant works to help shoppers dress fashionably. The virtual fashion consultant can be embodied as a database associating body characteristics and age with certain garments and sizes. Additionally, the virtual fashion consultant can associate certain garments with other matching garments, or dissociate certain garments from other garments, based on style, size, type of garment, fabric, and other garment characteristics.

A key difference between the brand image criteria and the virtual fashion consultant is that the former is generally established and controlled by someone wholly independent from the user (thereby acting as an policy enforcer), while the latter may accept at least some input from the user in order to serve the user's objective ("user-directed"). For example, the user-directed virtual fashion consultant may offer the user various options for defining a target appearance to be achieved, such as, for example, Edgy, Youthful, Sexy, Ultra trendy, Mainstream trendy, Trendy but understated, Trendy but reserved, Elegant, Classic, Professional, Conservative, Accentuate certain selected body characteristics (e.g., neck, upper arms, lower arms, upper legs, lower legs, chest, abdomen, back, hips, etc.), or De-emphasize certain selected body characteristics.

Other examples of user inputs to the virtual fashion consultant can include selecting from a set of places or events to which an outfit is to be worn, such as, for example, Formal office, Casual office. After-hours professional social, Black Tie affair, Formal Social event, Semi-formal, Informal but fashionable, Casual, Most Attendees ages 60+, Most Attendees ages 45+, Most Attendees ages 40-60, Most Attendees ages 30-40, Most Attendees ages 22-30, Most Attendees ages 18-22, Most Attendees ages 14-18, Most Attendees ages 11-14, or Most Attendees ages 5-11.

Users could specify a degree of "age-appropriateness" to be considered by the virtual fashion consultant. Once the user sets up the user-directed virtual fashion consultant with the desired fashion objectives, the virtual fashion consultant will limit or rank the set of available garment types, styles, and sizes in view of the user's body characteristics, age, etc., and in further view of the fashion objectives.

There can also be applications that are a hybrid between the employer-enforced brand image criteria and user-directed virtual fashion consultant. One example of such an application is for a planned event coordinator to define virtual fashion consultant rules for certain classes of event attendees (a prototypical situation is for a bride or wedding planner to establish a set of dress rules for people in the bridal party, and dress suggestions for guests).

Another hybrid type application permits fashion designers to define a set of designer-driven fit criteria for each garment in their product offering. Users (such as shoppers) can be given the option to choose to be "dressed by the actual designer." This way, the users can be assured that they will be wearing the garment as intended by its creator.

System embodiments related to these concepts can include additional features for facilitating entry/selection of the sizing/fashion rules. Also, there could be multiple levels of administrator-type accounts to permit users having different levels of permissions to appropriately control the sizing/fashion rules.

As described above in greater detail, one aspect of the invention is directed to using virtual sizing sessions to obtain a virtual sizing result which, in turn, is used to set up actual sizing sessions. The sizing session appointments can be coordinated such that the right sizes and style of garments will be available for each particular employee at the time of his or her appointment. Also, preferably, employees requiring different uniforms to try on are scheduled to attend at the same time to avoid delays.

This aspect of the invention can be applied to retail scenarios. For example, shoppers using the Web can utilize the virtual sizing application to select a set of garments for trying on. These shoppers can schedule a fitting session at the retail store Or at a designated place with dressing rooms. Preferably, the shopper can specify any special accommodations needed in the dressing room (such as wheelchair access and related accommodations).

In preparation for the appointment, the virtual sizing application would transmit information to the store or fitting room to enable the retailer to arrange the shopper's selected garments in a suitable dressing room. Preferably, the prepared set of garments would include the best size determined as the virtual sizing result, but in addition, smaller and larger sizes could be provided. The system can maintain a database of relative sizing variations between different manufacturers. For example, the system may know that pants by manufacturer A tend to run longer than the same size pants by manufacturer B. When coordinating or preparing for the fitting session, the system can arrange to have alternative brands for the same garment type available for the shopper to try on.

In a related embodiment, the virtual sizing result could include size deviation tendency information for the shopper. For example, based on the shopper's shoulder width and arm length, the standard sleeve length size of 37 may be too long while the standard size of 35 may be too short. The system could search for shirt brands that offer similar style garments and that tend to generally run relatively shorter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

What is claimed is:

1. A method of selecting, ordering, or furnishing apparel for individual members of a group such that the group members are dressed to project a commonly-governed image, the method comprising:
    establishing image criteria that associate a first set of apparel specifications with corresponding first set of body properties according to a desired image to be maintained for the group, the first set of apparel specifications including a first range of at least one apparel size, and the first set of body sizes includes a first range of at least one body measurement;
    conducting virtual sizing sessions with participating members of the group via an interactive virtual sizing application interfaced with a computer network, including automatically gathering user-specific information from a set of users over the computer network, wherein the set of users includes at least a first participating member of the group; and
    generating a set of virtual sizing results, including processing user-specific information gathered from the set of users, wherein the processing is based on the image criteria, and wherein the set of virtual sizing results includes at least a first virtual sizing result associated with the first participating member of the group.

2. The method of claim 1, wherein the group is a workforce, wherein the group members are employees of the workforce, wherein the image criteria is brand image criteria, and wherein the apparel includes uniforms to be worn by the workforce.

3. The method of claim 1, wherein the set of apparel specifications includes at least one specification selected from the group consisting of: garment size; a garment dimension; a garment type; and a garment style.

4. The method of claim 1, wherein the body properties include at least one physical attribute selected from the group consisting of: a gender; at least one body dimension; a body type classification; a body shape classification; a body silhouette classification; and at least one ratio of body dimensions.

5. The method of claim 1, wherein the image criteria includes an association of a first garment with a second garment.

6. The method of claim 1, wherein the user-specific information includes at least one information type selected from the group consisting of: at least one body measurement; body type selection; a body shape selection; a body silhouette selection; a style preference; a fit preference; a preference based on selected famous brand apparel; material allergy information; maternity status; and special need.

7. The method of claim 1, wherein the processing includes computing user-specific information from the first participating member of the group to produce a set of body properties that are associated with the first participating member of the group.

8. The method of claim 1, wherein the first virtual sizing result includes at least one result type selected from the group consisting of an apparel size determination; an apparel size selection recommendation for the first participating member; an apparel type selection recommendation for the first participating member; a recommendation to adjust a preference entry in order for the first participating member to comply with the image criteria; an indication that virtual sizing has failed; and an indication that the first participating member requires further apparel fitting service.

9. The method of claim 8, wherein the set of virtual sizing results includes a second virtual sizing result associated with a second participating member of the group; and
    wherein the second virtual sizing result includes at least one result type that is not included in the first virtual sizing result 10. The method of claim 1, wherein the automatically gathering of the user-specific information includes:
    gathering a first type of user-specific information to obtain a gathered first information item; gathering a second type of user-specific information to obtain a gathered second information item, wherein the first type of user-specific information and the second type of user-specific information are at least partially overlapping at respective overlapping information portions; and comparing the gathered first information item and the gathered second information item to evaluate informational consistency of the respective overlapping information portions.

11. The method of claim 10, further comprising:
    establishing an acceptable range of consistency for the overlapping information portions; and
    indicating an existence of a problem in the first virtual sizing result if the informational consistency of the overlapping portions is outside of the acceptable range of consistency.

12. The method of claim 1, wherein the user-specific information includes a combination of objective facts about each user from the set of users and subjective preferences of each user; and wherein the generating of the first virtual sizing result includes producing an apparel size selection that substantially accords with the objective facts about the first participating member of the group, and that accommodates the subjective preferences of the first participating member of the group to an extent that is consistent wit the image criteria.

13. The method of claim 1, further comprising:
    transmitting the first virtual sizing result over the computer network for display to the first participating member of the group.

14. The method of claim 13, wherein the display includes a graphical image of a garment according to the first virtual sizing result worn by a virtual model having body properties based on the user-specific information from the first participating member of the group.

15. The method of claim 1, further comprising:
    interactively scheduling a style session for the first participating member of the group over the computer network.

16. The method of claim 15, wherein the scheduling is based on the first virtual sizing result.

17. The method of claim 1, further comprising:
interactively ordering at least one item of apparel for the first participating member of the group based on the first virtual sizing result.

18. The method of claim 1, further comprising:
fabricating apparel for the first participating member of the group based on the first virtual sizing result 19. The method of claim 1, further comprising:
selecting apparel for delivery to a style session, wherein the selecting is based on the first virtual sizing result.

20. The method of claim 1, wherein the generating of the set of virtual sizing results includes aggregating user-specific information gathered from a first plurality of the participating members of the group to produce a first set of survey results, and generating a first apparel procurement forecast based on the first set of survey results.

21. The method of claim 1, further comprising:
maintaining a user profile for the first participating member of the group, wherein the user profile includes at least a portion of the user-specific information.

22. The method of claim 1, further comprising:
maintaining a set of user account records for the first participating member of the group.

23. The method of claim 1, further comprising:
restricting permission for the first participating member of the group to view or modify at least a restricted portion of the image criteria.

24. The method of claim 1, further comprising
processing the user-specific information from additional participating members of the group based on the image criteria to generate a plurality of virtual sizing results that include the first virtual sizing result; and
computing apparel fabrication requirements for the group based on the plurality of virtual sizing result&

25. The method of claim 1, further comprising:
processing the user-specific information from additional participating members of the group based on the image criteria to generate a plurality of virtual sizing results that include the first virtual sizing result; and
defining standard apparel sizes based on the plurality of virtual sizing results.

26. The method of claim 1, wherein the conducting of the virtual sizing sessions includes generating a sequence of information prompts including a first information prompt and a second information prompt that is subsequent to the first information prompt, wherein the second information prompt provides an offering of selectable options, and wherein the selectable options provided in the offering are based on information provided in response to the first information prompt and on the image criteria.

27. The method of claim 26, wherein the first information prompt is for a fit preference, and wherein the second information prompt provides an offering of a plurality of body silhouette options.

28. The method of claim 1, further comprising:
establishing individual user accounts for each participating member of the group; and
configuring each of the individual user accounts with employment information specific to each participating member of the group.

29. The method of claim 28, further comprising:
establishing a group account specific to the group; and
providing administrative access to an image authority, wherein the administrative facilitates the establishing of the image criteria.

30. A method of surveying a group in connection with the group's apparel needs, the method comprising:
conducting virtual sizing sessions with participating members of the group via an interactive virtual sizing application interfaced with a computer network, including automatically gathering user-specific information from a set of users over the computer network; and
generating a set of survey results, including aggregating the user-specific information gathered from the set of users; and
generating a uniform procurement forecast based on the set of survey results.

31. The method of claim 30, wherein the participating group members are employees of the workforce, and wherein the apparel includes uniforms to be worn by the workforce.

32. The method of claim 30, wherein the user-specific information includes at least one information type selected from the group consisting of: at least one body measurement; body type selection; a body shape selection; a body silhouette selection; a style preference; a fit preference; a preference based on selected famous brand apparel; material allergy information; maternity status; and special need.

33. The method of claim 30, wherein the automatically gathering of the user-specific information includes:
gathering a first type of user-specific information to obtain a gathered first information item; gathering second type of user-specific information to obtain a gathered second information item, wherein the first type of user-specific information and the second type of user-specific information are at least partially overlapping at respective overlapping information portions; and comparing the gathered first information item and the gathered second information item to evaluate informational consistency of the respective overlapping information portions.

34. The method of claim 30, further comprising:
automatically scheduling a style session over the computer network.

35. The method of claim 30, further comprising:
selecting apparel for delivery to a style session site, wherein the selecting is based on the set of survey results.

36. The method of claim 30, further comprising:
establishing image criteria that associate a set of apparel specifications with corresponding body properties according to a desired image to be maintained for the group; and
wherein the conducting of the virtual sizing sessions includes presenting selectable options to each participating member of the group, and applying the image criteria to limit the selectable options presented to each participating member of the group.

37. The method of claim 36, wherein:
the set of apparel specifications includes at least one specification selected from the group consisting of: garment size; a garment dimension; a garment type; and a garment style;
the body properties include at least one physical attribute selected from the group consisting of: a gender; at least one body dimension; a body type classification; a body shape classification; a body silhouette classification; and at least one ratio of body dimensions; and the image criteria includes an association of a first set of uniform specifications with a first set of body properties.

38. A method of selecting, ordering, or furnishing apparel for individual members of a group such that the group members are dressed to project a commonly-governed image, the method comprising:

establishing image criteria that associate a set of apparel specifications with corresponding body properties according to a desired image to be maintained for the group;

conducting virtual sizing sessions with participating members of the group via an interactive virtual sizing application, including:

prompting each of the participating members of the group for user-specific information that includes at least one selection from among selectable options;

applying the image criteria to user-specific information to determine which selectable options to present to each of the participating members;

presenting selectable options to each of the participating members according to the image criteria; and gathering a first type of user-specific information and a second type of user-specific information from a first participating member of the group, wherein the first type of user-specific information and the second type of user-specific information are at least partially overlapping at respective overlapping information portions.

39. The method of claim 38, wherein the group members are employees of the workforce, wherein the image criteria is brand image criteria, and wherein the apparel includes uniforms to be worn by the workforce.

40. The method of claim 38, wherein: the set of uniform specifications includes at least one specification selected from the group consisting of: garment size; a garment dimension; a garment type; and a garment style;

the body properties include at least one physical attribute selected from the group consisting of: a gender; at least one body dimension; a body type classification; a body shape classification; a body silhouette classification; and at least one ratio of body dimensions; the image criteria includes an association of a first range of sizes of a first uniform type with a second range of sizes of a second uniform type; and the user-specific information includes at least one information type selected from the group consisting of: at least one body measurement; body type selection; a body shape selection; a body silhouette selection; a style preference; a fit preference; a preference based on selected famous brand apparel; material allergy information; maternity status; and special need.

41. The method of claim 38, wherein the prompting includes generating a sequence of information prompts including a first information prompt and a second information prompt that is subsequent to the first information prompt wherein the first information prompt is for a fit preference, and wherein the second information prompt provides an offering of a plurality of selectable body silhouette options.

42. The method of claim 38, wherein the user-specific information includes a combination of objective facts and subjective preferences relating to each respective participating member of the group; and further comprising:

generating a first virtual sizing result corresponding to a first participating member of the group, including determining a uniform size that substantially matches the objective facts about the first participating member, and that accommodates the subjective preferences of the first participating member to an extent that is consistent with the image criteria.

43. The method of claim 42, further comprising:

automatically interactively scheduling a style session for the first participating member of the group based on the first virtual sizing result.

44. The method of claim 42, further comprising:

automatically interactively ordering apparel for the first participating member of the group based on the first virtual sizing result.

45. A system for managing apparel needs for a group, the system comprising:

a network interface that communicates information over a computer network;

a set of group-specific data, including image criteria that associate a set of uniform specifications with corresponding body properties according to an established image; a virtual sizing application communicatively coupled with the network interface and the set of group-specific data, wherein the virtual sizing application automatically gathers user-specific information over the computer network, and generates a virtual sizing result based on the user-specific information and the image criteria; and an administrative interface that provides administrative access to an image authority and facilitates the establishing the image criteria.

46. The system of claim 45, wherein the group is a workforce, wherein the group members are employees of the workforce, wherein the image criteria is brand image criteria, and wherein the apparel includes uniforms to be worn by the workforce.

47. The system of claim 45, wherein:

the set of uniform specifications includes at least one specification selected from the group consisting of: garment size; a garment dimension; a garment type; and a garment style;

the body properties include at least one physical attribute selected from the group consisting of: a gender; at least one body dimension; a body type classification; a body shape classification; a body silhouette classification; and at least one ratio of body dimensions;

the image criteria includes an association of a first set of uniform specifications with a first set of body properties; and the user-specific information includes at least one information type selected from the group consisting of: at least one body measurement; body type selection; a body shape selection; a body silhouette selection; a style preference; a fit preference; a preference based on selected famous brand apparel; material allergy information; maternity status; and special need.

48. The system of claim 45, wherein the virtual sizing result includes at least one result type selected from the group consisting of: an apparel size determination; a size selection recommendation for the first participating member; a recommendation to adjust a preference entry in order for the first participating member to comply with the image criteria; an indication that virtual sizing has failed; and an indication that the first participating member requires further apparel fitting service.

49. The system of claim 45, wherein the virtual sizing application is adapted to:

gather a first type of user-specific information to obtain a gathered first information item;

gather a second type of user-specific information to obtain a gathered second information item, wherein the first type of user-specific information and the second type of user-specific information are at least partially overlapping at respective overlapping information portions; and compare the gathered first information item and the gathered second information item to evaluate informational consistency of the respective overlapping information portions.

50. The system of claim 45, wherein the user-specific information includes a combination of objective facts about each user from a set of users and subjective preferences of each user; and wherein the first virtual sizing result includes a uniform size selection that substantially accords with the objective facts about a first participating member of the group, and that accommodates the subjective preferences of the first participating member of the group to an extent that is consistent with the image criteria.

51. The system of claim 45, wherein the network is the Internet, and wherein the network interface includes a Web server application that transmits the virtual sizing result over the network.

52. The system of claim 45, further comprising:
a style session scheduler communicatively coupled with the virtual sizing application, wherein the style session scheduler automatically interactively schedules a style session appointment over the computer network based on the virtual sizing result.

53. The system of claim 45, further comprising:
a customer servicer communicatively coupled with the virtual sizing application, wherein the customer servicer automatically facilitates interactive order placement for a garment over the computer network.

54. The system of claim 45, further comprising:
a statistical data analyzer communicatively coupled with the virtual sizing application that facilitates gathering of a plurality of virtual sizing results.

55. The system of claim 45, further comprising:
user-specific storage that maintains a set of user accounts.

* * * * *

UNITED STATES PATENT AND TRADEMARK OFFICE
CERTIFICATE OF CORRECTION

PATENT NO.       : 7,548,794 B2                                          Page 1 of 1
APPLICATION NO.  : 11/659056
DATED            : June 16, 2009
INVENTOR(S)      : Chris Vandergriff et al.

It is certified that error appears in the above-identified patent and that said Letters Patent is hereby corrected as shown below:

On the Title Page, Item (75) the spelling of 2nd Inventor's name should read Jeannamarie Peifer.

Col. 19 line 34, at the end of Claim 24, please delete "&" and insert --.--.

Signed and Sealed this

Fourth Day of August, 2009

JOHN DOLL
*Acting Director of the United States Patent and Trademark Office*